June 14, 1932.  L. A. BIXBY  1,863,182
DISK CLUTCH
Filed Dec. 12, 1930
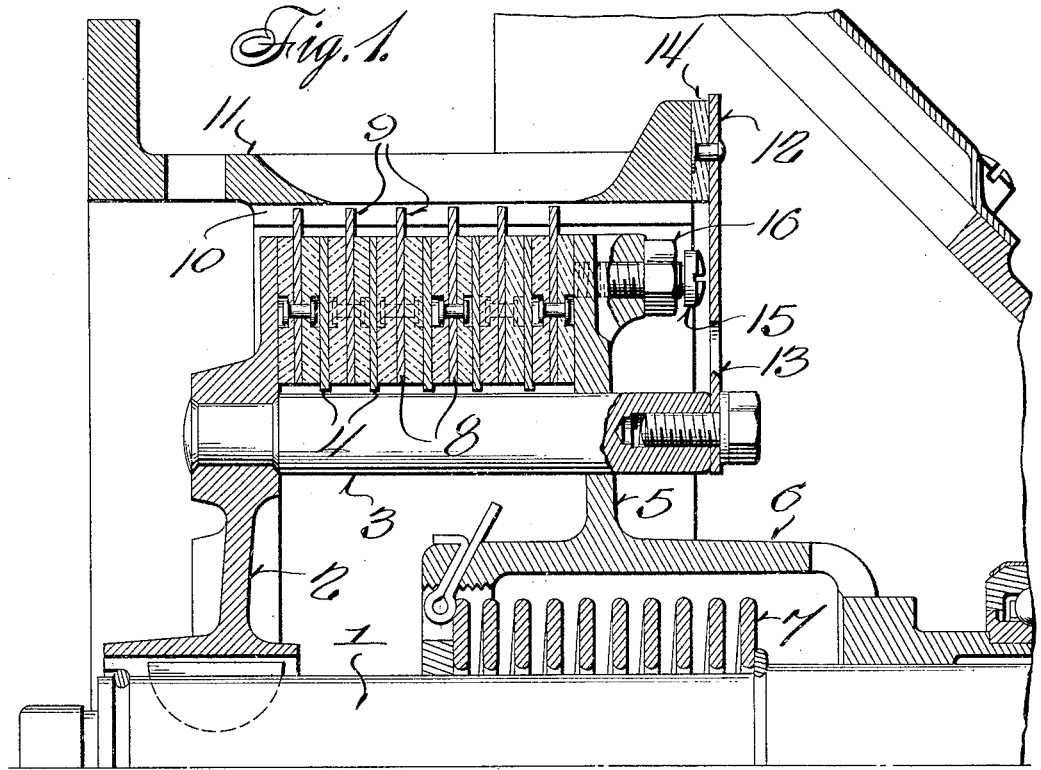
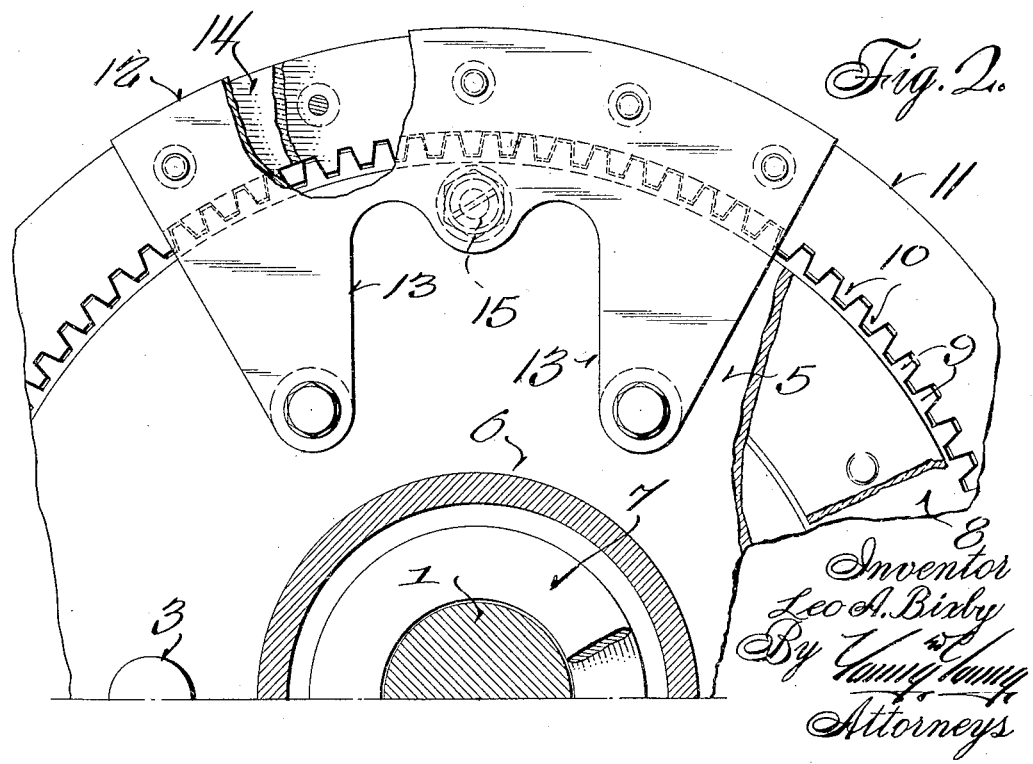

Patented June 14, 1932

1,863,182

UNITED STATES PATENT OFFICE

LEO A. BIXBY, OF MILWAUKEE, WISCONSIN, ASSIGNOR TO UNIT CORPORATION OF AMERICA, OF MILWAUKEE, WISCONSIN

DISK CLUTCH

Application filed December 12, 1930. Serial No. 501,883.

This invention relates to disk clutches, and has primarily for its object to provide means for eliminating rattling noises between the driving member and driving disks.

At the present time, it is customary in multiple disk clutches to provide a loose fit between the interengaging projections of the driving member and the driving disks in order that they may have free relative sliding action during engagement and disengagement of the clutch. The loose fit in question results in objectionable noise as the inter-engaging portions of the driving ring and disks engage each other.

The present invention aims to overcome the foregoing objection by the provision of means for creating frictional engagement between the inner and outer driving members just prior to and during engagement of the clutch, whereby the projections of the outer driving member are held in intimate engagement with the projections of the driving disks.

A further object is to provide means for eliminating the frictional engagement between the driving and driven members when the clutch is disengaged.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing, Figure 1 is a fragmentary longitudinal section through a multiple disk clutch constructed in accordance with the present invention; and Figure 2 is a fragmentary end elevation of the same.

Referring now more particularly to the accompanying drawing, the numeral 1 designates a driven shaft having secured thereon in any suitable manner, a clutch plate 2 which carries studs 3 on which the driven disks 4 are splined or carried in the usual manner.

Cooperating with the clutch plate 2 to provide the necessary pressure upon the clutch disks, is a compression plate 5 provided with a hollow hub 6 loosely journalled on the driven shaft 1 for longitudinal movement on the shaft by means of the conventional spanner, not shown. A compression spring 7, housed within the hollow hub 6, serves to normally urge the compression plate 5 into engagement with the clutch disks. Alternately positioned between the driven disks 4 are the usual driving disks 8 provided with teeth or projections 9 having loose engagement with corresponding projections 10 carried by an outer driving ring 11. Thus, it will be seen that the driving disks are splined or keyed to the driving ring 11, while the driven disks are splined or keyed upon the studs 3 carried by the disk plate 2.

Naturally, when the compression plate 5 is released, the spring 7 will force the same into engagement with the clutch disks to create sufficient frictional pressure to cause power to be transmitted from the driving ring 11 to the disk plate 2 and thence to the driven shaft 1.

The foregoing is more or less conventional and therefore forms no part of the present invention, it being understood that such structure results in the objections heretofore set forth.

As set forth in the objects, the present invention aims to overcome noise resulting from engagement between the driving disks and the driving member 11 during operative engagement of the clutch. This is accomplished by means of a tension member comprising a resilient plate 12 provided with spaced fingers 13 secured upon two adjacent rods 3.

Fastened to the outer periphery of the plate 12 by rivets or other suitable means, is an arcuate strip of lining material 14, such as is used between the clutch disks, the strip 14 engaging the end face of the outer driving ring 11, when the clutch is engaged as shown in Figure 1. Thus, it will be seen that when the clutch is engaged there will be a direct frictional contact or engagement effected between the driving ring and the disk plate, irrespective of the clutch disks. In order to eliminate this frictional engagement when the clutch is disengaged, the compression plate 5 carries a threaded stud 15, the head of which engages the plate 12 as the compression plate 5 is retracted to release the clutch disks.

A set nut 16 serves to lock the stud 15 in adjusted position, whereby frictional engagement between the plate 12 and the driving member is released or engaged at any desired point of operation of the clutch.

From the foregoing explanation taken in connection with the drawing, the operation of the present invention will be quite apparent, in that when the clutch is released, the stud 15, carried by the compression disk 5, serves to hold the resilient plate 12 out of engagement with the face of the driving ring 11, and upon releasing the compression plate 5, frictional engagement between the resilient plate 12 and the driving ring 11 is effected, just prior to the operative engagement of the clutch disks resulting from the pressure created between the compression plate 5 and the disk plate 2.

The advantage of the foregoing operation will be apparent in that the drag or frictional engagement created directly between the driving member 11 and driven plate 2 causes a lag upon the clutch disks with relation to the driving member, which results in one face of the projections of the driving disks being held into intimate contact with the corresponding faces of the projections of the driving ring, thus eliminating the usual slaping noise that occurs not only during engagement of the clutch, but also during the driving operation of the same.

While one specific form of the invention has been illustrated and described in considerable detail, it will be understood that changes in detail may be made without departing from the spirit or the scope of this invention.

Having thus specifically described the invention, what I claim is:

1. In a disk clutch comprising a driving member and a driven member and clutch disks loosely carried by said members for operatively connecting said members, pressure means creating frictional engagement between said driving member and driven member, said means comprising a resilient plate carried by one of said members and frictionally engaging the other of said members when the two are operatively engaged.

2. In a clutch, a drive and a driven member, clutch disks loosely carried by said members, spring means normally urging the disks carried by said members into frictional driving contact, and a tension plate carried by one of said members for contact with the other of said members when the disks are in frictional driving contact.

3. In a clutch, a driven member having a plurality of supporting and driving studs, a driving member receiving the driven member, a plurality of clutch disks carried by the studs, a plurality of clutch disks loosely carried by the driving member and disposed between the first mentioned clutch disks, a resilient plate connected at its inner end with certain of the studs and a frictional pad connected with one face of the resilient plate at its outer end for frictional engagement with the driving member when the clutch disks of the drive and driven members are in driving contact.

In testimony that I claim the foregoing I have hereunto set my hand at Milwaukee, in the county of Milwaukee and State of Wisconsin.

LEO A. BIXBY.